US000001048H

United States Statutory Invention Registration [19]

[11] Reg. Number: H1048

[43] Published: May 5, 1992

Wilson et al.

[54] COMPOSITE FRAGMENTING ROD FOR A WARHEAD CASE

[75] Inventors: Leonard T. Wilson, Fredericksburg; Charles R. Garnett, Dahlgren; William M. Henderson, Ninde, all of Va.

[73] Assignee: The United States of America as represented by the Secretary of the Navy, Washington, D.C.

[21] Appl. No.: 740,528

[22] Filed: Aug. 5, 1991

[51] Int. Cl.[5] ..... F42B 12/32

[52] U.S. Cl. ..... 102/496; 102/364; 102/389; 102/506

[58] Field of Search ..... 102/364, 365, 491–497

[56] References Cited

U.S. PATENT DOCUMENTS

| | | | |
|---|---|---|---|
| H 238 | 3/1987 | Adams | 102/493 |
| 90,164 | 5/1869 | Gibson | 102/493 |
| 631,703 | 8/1889 | Dunn | 102/494 |
| 1,197,465 | 9/1916 | Dunwoody | 102/364 |
| 1,203,062 | 10/1916 | Semple | 102/389 |
| 2,342,112 | 2/1944 | Bencal | 102/365 |
| 2,615,396 | 10/1952 | Fiser et al. | 102/365 |
| 3,508,493 | 4/1970 | Olenick, Jr. | 102/491 |
| 3,799,054 | 3/1974 | LaRocca | 102/64 |
| 3,815,504 | 6/1974 | Tieben | 102/67 |
| 3,977,327 | 8/1976 | Brumfield et al. | 102/67 |
| 4,167,140 | 9/1979 | Biserod | 102/364 |
| 4,216,720 | 8/1980 | Kempton | 102/67 |
| 4,305,333 | 12/1981 | Altenau et al. | 102/306 |
| 4,419,936 | 12/1983 | Coates et al. | 102/364 |
| 4,503,776 | 3/1985 | Nussbaum et al. | 102/496 |
| 4,592,283 | 6/1986 | Hellner et al. | 102/493 |
| 4,644,867 | 2/1987 | Hellner et al. | 102/495 |
| 4,781,117 | 11/1988 | Garnett et al. | 102/493 |

FOREIGN PATENT DOCUMENTS

| | | | |
|---|---|---|---|
| 1944224 | 3/1971 | Fed. Rep. of Germany | 102/497 |
| 75102 | 3/1961 | France | 102/491 |
| 75103 | 3/1961 | France | 102/491 |

*Primary Examiner*—Harold J. Tudor
*Attorney, Agent, or Firm*—John D. Lewis; Kenneth E. Walden

[57] ABSTRACT

A rod is constructed using two or more materials. It is notched so that when it is subject to an explosive load it will break into individual fragments of predetermined shape and size. Rod materials are selected so that a combination of two or more kill mechanisms can be included in a single fragment. If desired, the rod can be divided into segments that contain liquid compounds.

7 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

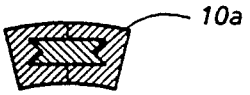
FIG. 5A
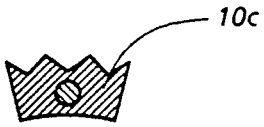
FIG. 5C
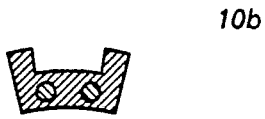
FIG. 5B
FRAGMENT MATERIAL ALTERNATIVES
| MATERIAL | FRAGMENT TYPE | | |
|---|---|---|---|
| | PENETRATING | INCENDIARY | VAPORIFIC |
| STEEL | X | | |
| TUNGSTEN | X | | |
| ZIRCONIUM | | X | |
| ALUMINUM | | | X |
| TITANIUM | | X | X |
| MISCH METAL | | X | |
| MAGNESIUM | | X | X |
| DEPLETED URANIUM | X | X | |
| LIQUIDS | | X | X |
| • • • | | | |
FIG. 6

COMPOSITE FRAGMENTING ROD FOR A WARHEAD CASE

The invention described herein may be manufactured and used by and for the Government of the United States of America for governmental purposes without the payment of any royalties thereon or therefor.

BACKGROUND OF THE INVENTION

The field of the invention is that of ordnance and warhead construction. The present invention relates to fragmentary warhead construction and to the construction of discrete fragment warheads. In particular, the invention relates to a novel way of constructing warhead fragments within a fragmenting rod, wherein a plurality of fragment kill mechanisms may be incorporated within a single rod.

In the prior art, most missile fragmentation warheads either use a solid steel case filled with explosive (which is the conventional design) or consist of explosive surrounded by a thin shell with "discrete" fragments glued to the shell which is generally called the discrete fragment design. In either case the warhead is then mounted into the ordnance section where structural loads are carried by a surrounding shroud.

An example of the conventional steel case design is LaRocca, U.S. Pat. No. 3,799,054 filed Mar. 26, 1974. This reference teaches a warhead for controlling the fragmentation of explosive devices having a cylindrical metallic fragmentation casing, wrapped with metallic strips of heavy density to cause fragments to form. This type of construction is limited to ordnance which has a single type of fragment, as the fragments are formed by the metal case. Because the fragmenting section is also load bearing and/or structurally supporting, some fragment materials are precluded. Only those materials which are structurally strong can be used for load bearing elements, thus eliminating many materials that could be used for fragments. In addition, the steel case design either employs heavy materials like LaRocca, or involves complex machining of the warhead case to form the fragments.

An example of discrete fragment design is represented by Brumfield et al., U.S. Pat. No. 3,977,327 filed Aug. 31, 1976. The Brumfield et al. reference is typical of many fragmentation schemes which precut fragments and then must sandwich them between steel or aluminum cylinders to form the case or missile airframe. Construction of this type of warhead is tedious and labor intensive.

It is also extremely difficult to manually place all the fragments in the required matrix pattern with each fragment aligned to precisely form the desired pattern. It is conventional to twist and shake the heavy warhead case to coax each fragment into its proprietary physical position, but gaps and spaces inexorably remain. These irregularities degrade performance and attenuate lethality.

It is, of course, possible to mix fragments of differing material when the discrete fragments are loaded into the warhead. A problem with this design is the uncertainty involved in the fragment pattern, as the fragments are dispersed radially from the center of the warhead upon detonation and the different type fragments will be on different bearings and heights. Thus, a small target might fall within a sector of the fragment pattern containing only one type of fragment. This would preclude any synergistic effect expected from mixing fragment kill mechanisms.

To date, most missile fragmentation warheads either use the conventional to discrete design. Both designs have associated advantages and disadvantages. In the conventional design the case is notched or welded to produce the desired fragment break up. The advantages to this design are that it reliably produces uniform size fragments with high velocities, and it is easily produced. One disadvantage to this design is that fragmentation customization is not easily performed. It is inherently difficult (if not possible) to use fragments of different materials without a performance penalty. Also, changing the fragment size and geometry is not easily done. In contrast, the discrete fragment design allows for easy tailoring of the fragments as fragments of differing materials and geometries are easily utilized, however, this warhead is much more costly to produce as each fragment must be attached to the warhead.

A related application by Applicants, filed even date with this application entitled Fragmenting Notched Warhead Rod, Ser. No. 07/740,524, addresses the production difficulties inherent with discrete fragment warheads. These notched rods are inserted as a unit into a warhead case to form the fragment matrix. The rod is notched so that when it is subjected to an explosive load it will break into individual fragments. The fragment size can be adjusted by varying the distances between notches, the thickness of the rod, and the rod width. Various materials can be selected to form this notched rod without concern for the strength of the warhead case. While these notched warhead rods greatly reduce the labor and cost associated with discrete fragmenting warhead construction, the fragment pattern uncertainty discussed above remains. The fragmenting rods may be laterally stacked on the periphery of the warhead with an amelioration of the fragment uncertainty problem, but complete kill mechanism integration throughout all fragment pattern sectors seems unlikely.

The present invention is an improvement of the fragmenting warhead rods designed to overcome the problems associated with fragment pattern uncertainty by formulating each rod with a plurality of fragment materials so that each rod will fragment into individual fragments having more than one kill mechanism. This insures that any target impacted, even by a single fragment, would suffer more than one kill mechanism.

SUMMARY OF THE INVENTION

The present invention consists of a composite rod constructed of a plurality of fragment materials and then grooved to define individual fragment shapes. The grooves cause the rod to break into individual fragments upon detonation, resulting in each fragment carrying more than one fragment kill mechanism. Because these rods are not load bearing, various materials may be combined without concern for the strength of the warhead case.

Therefore, an object of the present invention is to teach a device that can form a customized fragment pattern having a plurality of kill mechanisms that is easy to manufacture.

It is also an object to teach a method of forming a fragmenting warhead, with each single fragment having a plurality of kill mechanisms, without regard for the load bearing strength or ductility of the material.

It is yet another object of the instant invention to provide a device for forming a discrete fragment warhead that minimizes irregularities in the fragment pattern while imparting multiple kill mechanisms in each fragment.

A further object is to teach a warhead design that exhibits advantages of discrete fragments and multiple kill mechanisms without the high labor and assembly costs extant in the prior art.

Other objects, advantages and novel features of the invention will become apparent from the following detailed description of the invention when considered in conjunction with the accompanying drawings which show an advantageous embodiment of the invention and wherein like numerals designate like parts in the several figures, and wherein:

BRIEF DESCRIPTION OF THE DRAWINGS

FIG. 5A is a selected possible geometric fragment shape for use with the fragmenting rods of FIG. 2 and FIG. 3.

FIG. 5B is another selected geometric fragment shape.

FIG. 5C is yet another geometric fragment shape selected for illustration for use with the fragmenting rods of FIG. 2 and FIG. 3.

FIG. 6 is a table of possible materials that might be used in constructing the rods of FIG. 2 and FIG. 3

DETAILED DESCRIPTION

Figure 1:
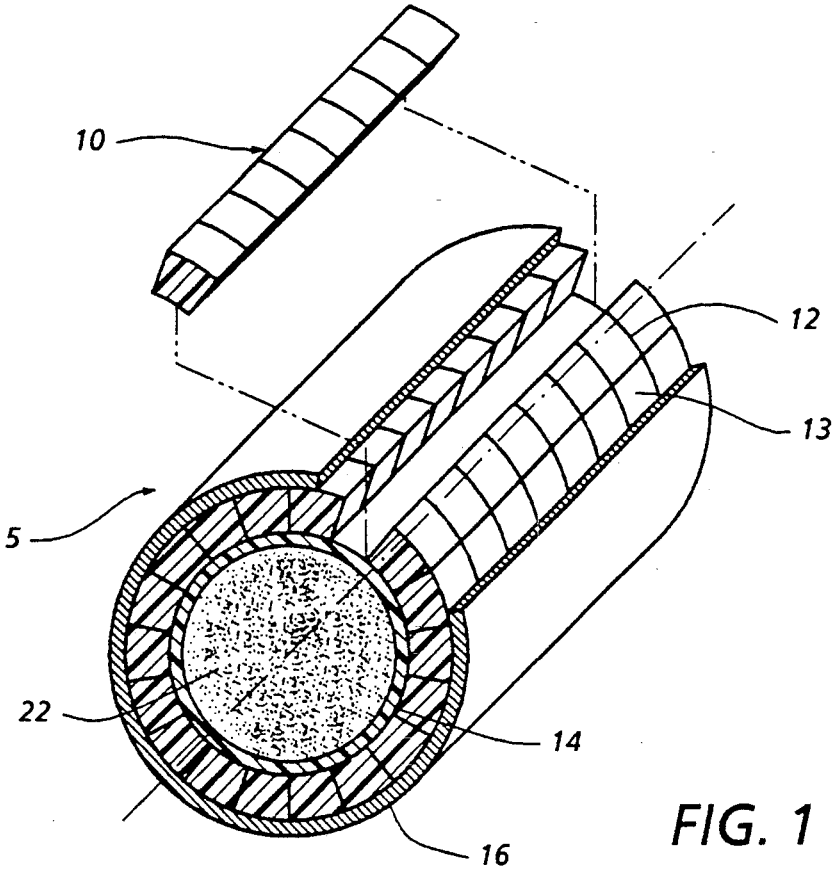
FIG. 1 is a pictorial view of a discrete fragment warhead containing the composite fragmenting rods of the present invention.

Turning now to FIG. 1, a warhead 5 is shown comprised of an inner case 14 and outer case 16 sandwiching the composite fragmenting rods 10 of the present invention. The composite rods 10 illustrated in FIG. 1 are notched with grooves 12 to form individual composite fragments 13. Warhead 5 is a conventional dual wall warhead containing high explosives (HE), 22, known to those skilled in the art. A novel type of dual wall warhead wherein the inner wall 14 and outer wall 16 are comprised of composite materials is the subject of a separate application by Applicants entitled Filamentary Composite Dual Wall Discrete Fragment Warhead, filed even date with this application and bearing Ser. No. 07/740,522. The teachings of this related application, while considered nonessential to the claims appended hereto, provide a description of one of the many possible uses of Applicants' composite fragmenting rods.

On detonation of HE, 22, the rods 10 break into individual composite fragments 13 which have been designed to exhibit the desired mass, geometry and multiple target kill mechanisms.

Figure 2:
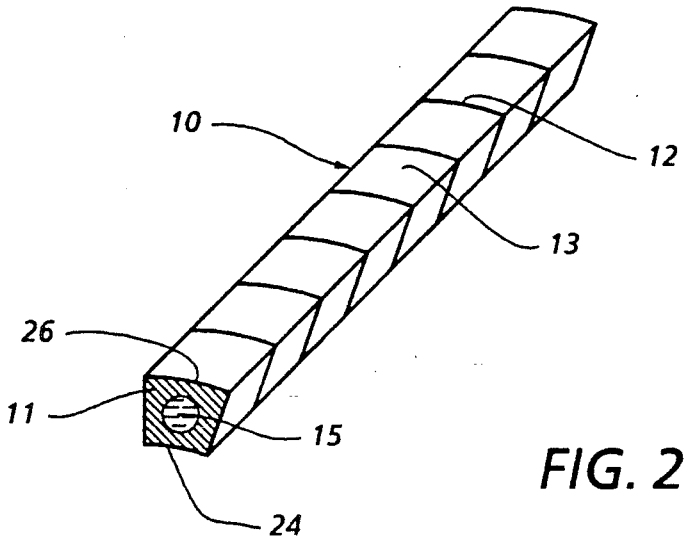
FIG. 2 is an isometric illustration of one of the fragmenting rods of the warhead of FIG. 1.

FIG. 2 illustrates an individual composite rod 10 which is the preferred embodiment for use in the most common type fragmenting warheads. Therein, composite rod 10 is shaped to have an inner radius 24 which is machined to conform to the outside surface of the inner case wall 14 of a dual case warhead such as illustrated in FIG. 1. Likewise, rod 10 has an outer radius 26 conforming to the inner radius of the outer warhead case 16 so that the fragments 13 formed by many rods 10 fit sandwiched between the dual walls, 14 and 16, of a warhead. It is intuitive to one skilled in the art of warhead technology that the rods might be fixedly attached to either or both of the warhead's walls 14 and 16, and that a plurality of rods 10 might be affixed one to another to form a fragmentation panel or blanket.

Another conventional type warhead would omit outer case 16 on the warhead illustrated in FIG. 1 to form a single walled ordnance case. In this embodiment, rods 10 would have inner radius 24 affixed to the outside surface of the single case of the warhead. Likewise, the rods could be glued to the outside surface of a single case It is important to note that rod 10 of FIG. 2 is comprised of two or more distinct materials 11 and 15. The materials are chosen for particular properties depending on the kill mechanism desired. For example, if the target were to be a fuel tank on a particular missile and lethality concerns dictated that both penetrating and incendiary fragments strike the target, material 11 could be tungsten, which is a known penetrating kill mechanism, and material 15 could be zirconium, which is a known incendiary.

Figure 3:
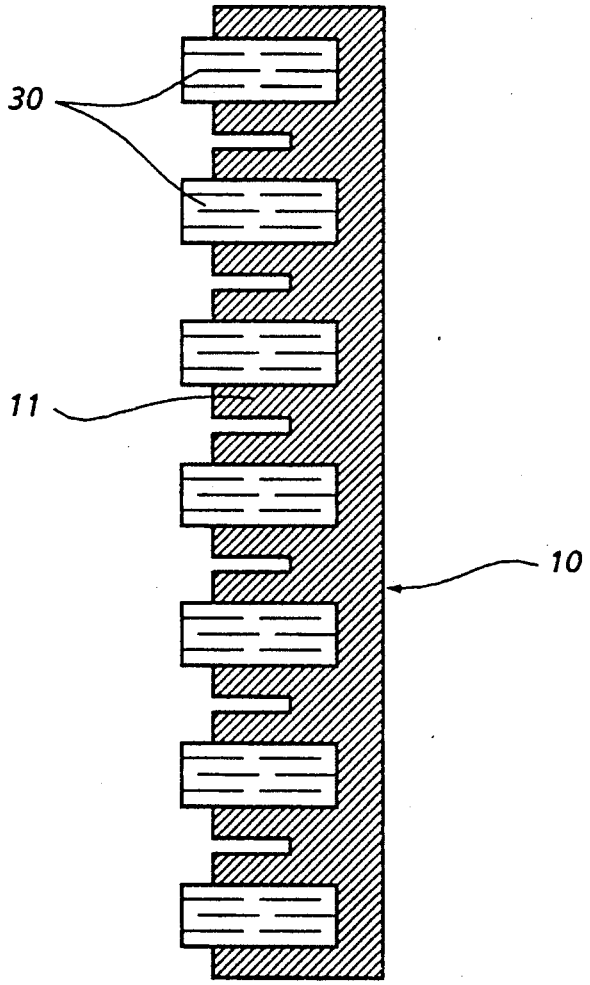
FIG. 3 is a side view illustration of one of the composite fragmenting rods of the warhead of FIG. 1 wherein each fragmenting section contains a liquid material.

FIG. 3 illustrates a composite fragmenting rod where each fragment section is comprised of both a solid 11 and a liquid 30 kill mechanism. In this embodiment, each segment of the composite notched rod 10 would be comprised of a solid kill mechanism 11 and would sealably contain a liquid material 30.

Figure 4A:
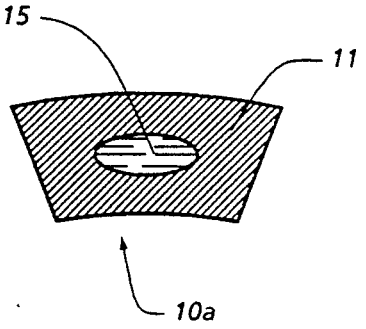
FIG. 4A is a selected combination composite fragmenting rod of the present invention.
Figure 4B:
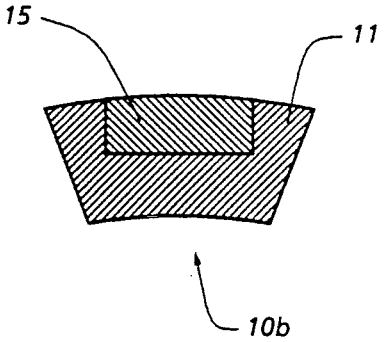
FIG. 4B is another selected combination composite fragmenting rod.
Figure 4C:
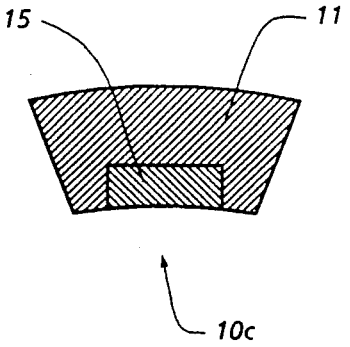
FIG. 4C is yet another selected combination composite fragmenting rod.
Figure 4D:
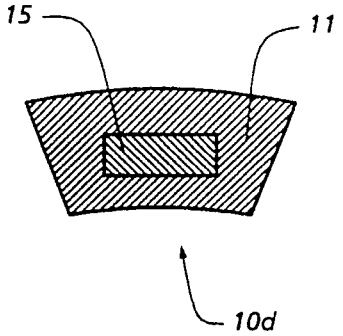
FIG. 4D is still another selected combination composite rod.
Figure 4E:
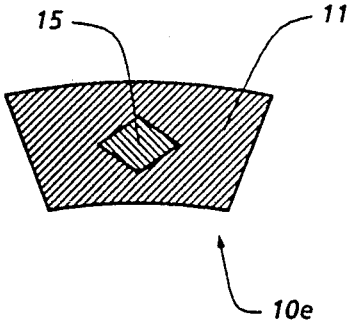
FIG. 4E is a final selected combination composite rod.

FIGS. 4A through 4E illustrate five of the innumerable combinations of materials and geometries possible with Applicants' composite fragmenting rods. FIGS. 4A, 4D and 4E illustrate combinations which might be used against hardened targets where rod 11 is comprised of a penetrating material and material 15 is either an incendiary or a vaporific material. FIG. 4B and 4C might be used against less robust targets and material 11 might be vaporific and material 15 incendiary. The possible combinations are endless and considered a design feature controlled by target parameters. It is considered within the scope of Applicants' invention to permute and juxtapose various fragment materials and geometries in whatever combination and pattern should present the best target kill mechanisms. It is also important to note that while only a combination of two materials have been chosen for illustration, three, four or more materials may be incorporated within the rods to obtain sophisticated results without departing from the scope of Applicants' invention.

While the rods chosen for illustration in FIG. 2 and FIG. 3 are notched with grooves 12 to form simple fragment patterns, it is important to note that more complex and/or irregular shaped grooves may be used to form any shape fragments desired.

FIGS. 5A, 5B and 5C illustrate only three of an infinite number of possible fragment shapes which might be formed in composite rod 10.

Composite rods 10 may be machined, extruded, pultruded, or constructed with a powder metallurgy process such as is disclosed in Hellner, et al., U.S. Pat. No. 4,592,283 filed Jun. 3, 1986. Thus, any fragment parameters may be obtained using rods 10 by selecting materials and changing geometric shape using construction techniques known to those of ordinary skill in the art.

FIG. 6 is a table juxtaposing various conventional fragment materials with the desired fragment kill mechanism. For instance, if a combination of penetration and incendiary effects are desired, then one of the materials in the penetration column could be combined with a material from the incendiary column to form a composite rod fragmenting into fragments, each having both properties. Likewise, a material combination would be chosen where at least one of the materials were vaporific if special effects were desired. The liquid materials may comprise any formula of many known to those in the warhead arts when the special kill mechanisms associated with liquids are desired. Examples of commonly known liquid kill mechanisms include mercury, napalm, gasoline, and virtually any reactive liquid material. In this case, the rods would be constructed from a solid material in table 6 chosen for its associated kill mechanism and a liquid would be sealably inserted therein using known construction techniques.

The materials listed in table 6 are illustrative only and any metal, metal alloy, composite or liquid that exhibits the characteristics desired in the fragment could be used and is considered within the scope of this invention.

Obviously, any permutation of materials and geometric positioning may be employed to obtain the precise design and kill mechanism desired and many modifications and variations of the present invention are possible in light of the above teachings without going outside the scope of Applicants' invention.

What we claim:

1. A composite fragmenting rod for use in a discrete fragment warhead comprising:

a scored rod comprising a plurality of preselected materials for disposing about an outside surface of an explosive material of the discrete fragment warhead.

2. A scored rod according to claim 1 wherein said rod is comprised of a plurality of materials selected from the group consisting of incendiary, penetrating and vaporific materials.

3. A scored rod according to claim 1 wherein said rod is scored to form fragments.

4. A scored rod according to claim 1 for disposing between inner and outer cases of a warhead.

5. A composite scored fragmenting rod for use in a discrete fragment warhead having sealable cavities for sealably containing a liquid;

a liquid material disposed within the sealable cavities of the warhead, and means for sealing the cavities whereby explosion of the warhead results in a plurality of discrete fragments each sealably containing a portion of said liquid material.

6. A composite scored fragmenting rod for use as a nonload bearing fragment section in a discrete fragment dual wall warhead comprising:

a scored rod comprising a plurality of solid fragment materials adapted to be disposed about an outside surface of an inner wall of the dual wall discrete fragment warhead wherein said scored rod resides between the outer and inner walls of the dual wall warhead resulting in a fragment matrix free of load bearing stresses where each individual fragment exhibits a plurality of kill mechanisms inherent in said plurality of solid fragment materials.

7. A composite scored fragmenting rod according to claim 1 wherein said plurality of solid fragment materials number at least 3.

* * * * *